: # 3,142,618
ANTIFUNGAL ANTIBIOTIC HUMIDIN AND PROCESS OF PREPARATION

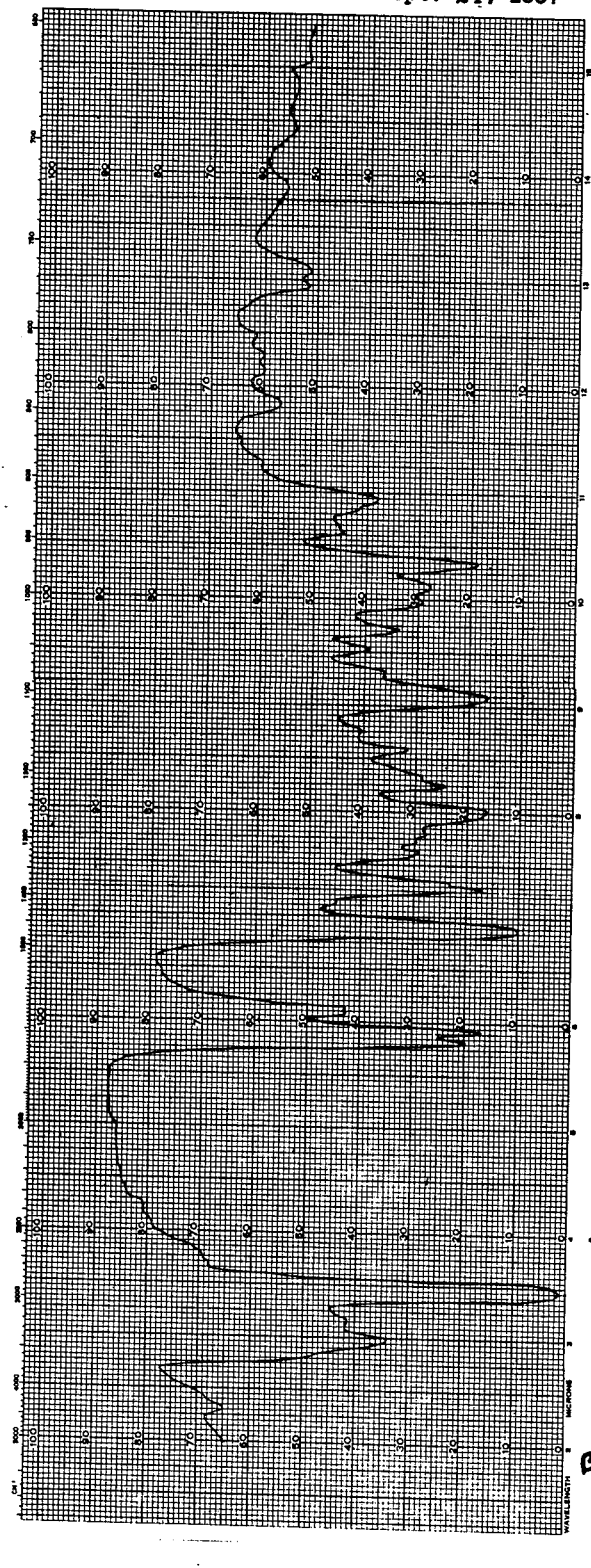

Kôiti Nakazawa, Amagasaki, Hiroichi Yamamoto, Kobe, Motoo Shibata, Toyonaka, Toshihiko Kanzaki, Eiji Higashide, and Akira Miyake, Nishinomiya, Hiromu Hitomi, Ibaraki, and Satoshi Horii, Kyoto, Japan, assignors to Takeda Pharmaceutical Industries, Ltd., Higashi-ku, Osaka, Japan
Filed Sept. 24, 1957, Ser. No. 685,880
Claims priority, application Japan Sept. 28, 1956
7 Claims. (Cl. 167—65)

The present invention relates to the new antibiotic Humidin and to the preparation thereof.

It has been found, according to the present invention, that *Streptomyces humidus* Nov. sp. Nakazawa et Shibata (IFO–3520, ATCC–12760), which has been disclosed inter alia in the copending Nakazawa, Shibata et al. application Ser. No. 647,681, filed March 21, 1957 (now Patent No. 2,931,756), as a dihydrostreptomycin-producing strain, also produces—besides dihydrostreptomycin—a new antibiotic having properties different from those of known antibiotics. The new antibiotic has been named "Humidin" and is so referred to herein.

As indicated, the aforementioned *Streptomyces humidus* strain, used as Humidin-producing strain in the present invention, has been deposited in the Institute for Fermentation, Osaka, Japan, under the designation IFO–3520 and in the American Type Culture Collection, Washington, D.C., under the designation ATCC–12760.

Bacteriological properties of the said strain are shown in the following Table 1, the colors indicated by the abbreviation "Rdg." being based upon "Ridgway's Color Standards and Color Nomenclature."

The carbon utilization of the aforesaid strain, determined according to the method of Pridham, is shown in the following table.

TABLE 2
*Carbon Utilization of* Streptomyces humidus *Nov. Sp. IFO–3520*

| | |
|---|---|
| d(+)-Xylose | ++ |
| l(+)-Arabinose | +++ |
| l(+)-Rhamnose | +++ |
| d-Fructose | +++ |
| d-Galactose | +++ |
| Sucrose | − |
| Maltose | +++ |
| Lactose | ++ |
| d(+)-Raffinose | − |
| Inulin | − |
| d-Mannitol | +++ |
| d-Sorbitol | − |
| Dulsitol | − |
| dl-Inositol | − |
| Salicin | ++ |
| Na-acetate | − |
| Na-citrate | ± |
| Na-succinate | + |
| Control | − |

− : No growth.
± : Growth doubtful.
∓ : Poor growth.
++ : Fair growth.
+++ : Good growth.

Like other streptomyces, the aforesaid strain is comparatively readily changeable naturally and artificially, and the above-mentioned properties may correspondingly change. For example, there are many variants and mu-

TABLE 1
*Cultural Characteristics of* Streptomyces humidus *Nov. Sp. IFO–3520*

| Medium | Cultural characteristics | | | Remarks |
|---|---|---|---|---|
| | Growth | Aerial mycelium and spores | Soluble pigment | |
| Czapek's agar | Colorless | White | None | |
| Glucose asparagine agar | ----do---- | White to Smok-gray (Rdg. XLVI, 21′′′′′-d) or Vinaceous-buff (Rdg. XL, 17′′′-d). | | Abundantly interspersed with small moist black patches which gradually spread over the whole surface. Reverse Cream-buff (Rdg. XXX, 19′′-d) or Cartridge-buff (Rdg. XXX, 19′′-f), later becoming Chamois (Rdg. XXX, 19′′-b). |
| Starch agar | ----do---- | White to Pale smoke gray (Rdg. XLVI, 21′′′′′-f). | None | Reverse Cream-buff (Rdg. XXX, 19′′-b). Hydrolysis slight. |
| Calcium malate agar | Colorless, later becoming Buff-yellow (Rdg. IV, 19-d). | Scanty White | ----do---- | |
| Glycerin nitrate agar | Colorless | ----do---- | ----do---- | |
| Dextrose nitrate agar | ----do---- | ----do---- | ----do---- | |
| Bouillon agar | ----do---- | None | ----do---- | |
| Gelatin | ----do---- | ----do---- | ----do---- | Moderate liquification. |
| Potato plug | ----do---- | White to Smoke gray (Rdg. XLVI, 21′′′′′-d). | ----do---- | Moist black patches observed. |
| Carrot plug | ----do---- | White to Smoke gray (Rdg. XLVI, 21′′′′′-d). | ----do---- | |
| Yeast extract agar | ----do---- | White to Light drab (Rdg. XLVI, 17′′′′′-b). | ----do---- | Partially moistened. |
| Whole egg | ----do---- | White | ----do---- | |
| Milk | ----do---- | ----do---- | ----do---- | Peptonization slowly. |
| Glycerin-asparaginate agar | ----do---- | White to Smoke gray (Rdg. XLVI, 21′′′′′-d). | ----do---- | |
| Peptone nitrate broth | | | | Nitrate reduction. |

Aerial mycelium of this strain shows spiral, 0.8–1.2μ, conidia oval, 1–1.5μ×1.5–2μ.

tants of the strain which have been isolated from soil or produced artificially by irradiation with X-rays or ultraviolet rays, or by the action of chemicals (cf. for example the aforesaid copending application). These strains can also be used in the method of the present invention as long as they produce Humidin. When cultivated aerobically in an aqueous medium, e.g. under the conditions hereinafter set forth, these strains produce dihydrostreptomycin as well as Humidin. Ability of the strains to produce dihydrostreptomycin and Humidin, the ratio of the two products, and the time required for their production are different, depending upon the cultural conditions and the particular strains. In general, dihydrostreptomycin is mainly contained in the liquid part of the culture, while the Humidin is mainly accumulated in the mycelium.

The potency of the Humidin produced during a culture process may be determined for example as follows:

*Streptomyces humidus* (IFO–3250), for example, is subjected to tank culture in the following medium:

| | |
|---|---|
| Glucose | grams 10 |
| Peptone | do 5 |
| Ehrlich meat extract | do 5 |
| Sodium chloride | do 5 |
| Agar | do 17–20 |
| Tap water | liters 1 |

(pH is adjusted to 7 with NaOH before sterilization)

During the culture, 100 milliliter samples are taken from the culture broth at intervals of about 12 hours. The sample is filtered, the wet mycelium is extracted with two times its weight of acetone at 60° C. for one hour, and the acetone extract submitted to assay, the value thus obtained being dsignated the potency of Humidin in 100 ml. of the whole culture broth. The results are shown in the following table.

TABLE 3

| Incubation period (hr.) | Filtrate | | Mycelium | | | Total units in 100 ml. of broth (u.) |
|---|---|---|---|---|---|---|
| | pH | Units (u./ml.) | Mycelium in 100 ml. (wet) (g.) | Acetone for extraction (ml.) | Units of extract (u./ml.) | |
| 14 | 6.0 | <10 | 5.4 | 11.8 | 35 | 400 |
| 26 | 6.2 | <10 | 8.0 | 16.0 | 100 | 1,600 |
| 38 | 7.0 | <10 | 8.9 | 17.8 | 1,000 | 17,800 |
| 50 | 7.6 | <10 | 6.2 | 12.4 | 3,500 | 43,500 |
| 62 | 7.6 | <10 | 8.2 | 16.4 | 15,000 | 246,000 |
| 74 | 7.0 | <10 | 8.0 | 16.0 | 15,000 | 240,000 |
| 86 | 7.0 | <10 | 7.9 | 15.8 | 15,000 | 238,000 |
| 98 | 7.0 | <10 | 9.1 | 18.2 | 15,000 | 273,000 |
| 110 | 7.0 | <10 | 6.6 | 13.2 | 20,000 | 264,000 |
| 122 | 7.0 | <10 | 7.5 | 15.0 | 15,000 | 225,000 |
| 134 | 7.2 | <10 | 7.0 | 14.0 | 20,000 | 280,000 |
| 136 | 7.2 | <10 | 7.0 | 14.0 | 20,000 | 280,000 |

The unit of potency of Humidin is determined as follows:

Crystalline Humidin is dissolved in acetone in a dilution of 1 mg./ml., the solution is diluted with water, and the resulting suspension is subjected to the agar dilution method, using *Saccharomyces cerevisiae* as test microorganism. The minimum amount (mcg./ml.) required for complete inhibition of growth of the microorganism under the naked eye is designated as one unit.

Various nutrients which are usable for the cultivation of microorganisms in general may be employed for the production of Humidin. As carbon source, there can be used, for example, starch, lactose, dextrin, glycerin, maltose, etc., and as nitrogen source there can be used various organic and inorganic nitrogen-containing substances such for example as soybean protein, meat extract, peptone, casein, yeast, cornsteep liquor, powdered peanut, nitrates, urea, ammonium salts, etc. A small quantity of inorganic salt or trace element may be added. Besides these substances, the mycelium of the Penicillium microorganisms or its processed products may be used as a nutrient source.

To manufacture Humidin industrially, the culturing is advantageously carried out by aerobical submerged culture in a medium prepared from the above-mentioned nutrients. The material can, however, also be prepared on a solid medium or by surface culture. Nearly neutral pH, a temperature of about 23° to 30° C. and a culture time of about 2 to 7 days are most suitable for the production of the new antibiotic.

The culture broth thus obtained contains dihydrostreptomycin and Humidin, and the former is chiefly contained in the liquid part and the latter in the mycelium, the two substances being generally produced simultaneously. It is a characteristic feature of Humidin that it is essentially accumulated in the mycelium. There appears to be no correlation between the quantity of the mycelium and that of the dihydrostreptomycin produced.

Humidin is isolated from the culture broth, especially from the mycelium. Therefore, it is advantageous for the isolation of Humidin to separate the mycelium and then to isolate Humidin from the mycelium. For the isolation of Humidin from the filtered broth, various characteristics of the antibiotic are utilized. For example, differences between Humidin and impurities in solubility, distribution coefficient, adsorbability, ionic bonding strength, etc. are utilized for the purpose.

Humidin is readily soluble in acetone, dioxane, acetic acid esters, hot alcohol, etc. and an acid pH enhances this solubility. Humidin is therefore advantageously isolated as follows, for example. The mycelium is extracted with one of the above solvents, the extract, after being concentrated, is acidified and treated with a hydrophilic organic solvent which can readily dissolve Humidin, such as acetic acid esters, and the solution is concentrated in vacuo, or the solution is made alkaline with alkali hydroxide, whereupon Humidin separates out. Thus, crude or fairly pure Humidin can be isolated comparatively readily by utilizing differences between the substance and impurities in solubility and distribution coefficient between two solvents. In general, the above method is the most convenient for the purification of Humidin. However Humidin can also be separated from impurities by adsorption with an adsorbent and subsequent elution. As adsorbent there can be used, for example, active carbon, diatomaceous earth, alumina, etc. Ion exchangers are also conveniently employed for the same purpose.

The above methods are effected batchwise in the form of adsorption chromatography, partition chromatography, counter current distribution and the like. Besides, such methods as precipitation with a suitable precipitant, salting out and dialysis may be employed. These methods are employed separately or in combination, and once or repeatedly. Further, adjustment of pH of the solution facilitates the separation of Humidin.

The Humidin thus obtained and purified by recrystallization from a solvent such as ethanol has the following properties:

(1) Melting point: 145–146° C. (decomp.).
(2) Crystal form: Hexagonal plate (colorless).
(3) Analytical values are as shown e.g. below, and nitrogen, halogen and sulfur could not be detected by qualitative tests:

| | C, Percent | H, Percent |
|---|---|---|
| No. 1 | 63.51 | 8.66 |
| No. 2 | 63.42 | 8.52 |
| No. 3 | 63.36 | 8.32 |
| No. 4 | 63.03 | 8.31 |

(4) Molecular weight: 550±50 (by Barger method); 823±10 (from X-ray goniometry and density).

The empirical formula $(C_{12}H_{20}O_4)n$ corresponds to the above data.

(5) Optical rotation:

$$[\alpha]_D^{34} = -6° \text{ (c.=1, ethanol)}$$
$$[\alpha]_D^{25} = -10° \text{ (c.=1, acetone)}$$
$$[\alpha]_D^{25} = -8° \text{ (c.=1, dioxane)}$$

(6) IR-spectrum: It was measured in the form of Nujol mull, using a prism made of NaCl. The curve is shown on the accompanying sheet of drawing.
The bands of the infrared spectrum follow:

| Absorption band | Relative intensity* | Absorption band | Relative intensity* |
|---|---|---|---|
| 2.99 | S | 9.54 | W |
| 3.15 | W | 9.71 | M |
| 5.82 | S | 9.98 | M |
| 5.92 | S | 10.25 | M |
| 6.07 | M | 10.34 | S |
| 6.13 | M | 10.63 | W |
| 7.63 | W | 10.94 | M |
| 7.71 | W | 11.84 | M |
| 7.79 | W | 12.15 | W |
| 8.01 | S | 12.28 | W |
| 8.25 | M | 12.47 | W |
| 8.40 | Sh | 12.93 | M |
| 8.59 | M | 13.07 | M |
| 8.75 | W | 13.87 | W |
| 9.10 | S | 14.42 | W |

*S: strong; M: medium; W: weak; Sh: shoulder.

UV-spectrum: it was measured as alcoholic solution. The absorption maxima were found in the vicinities of 245 mμ and 285 mμ.

(7) Color reaction:
  (i) The aqueous or alcoholic solution of Humidin gives no color with ferric chloride.
  (ii) It gives orange-red or red-purple color with concentrated sulfuric acid.
  (iii) It is negative to Fehling solution both under cold and hot conditions.
  (iv) Its acetone solution discolors potassium permanganate solution, and its ethereal solution gradually discolors bromine.

(8) Solubility: It is readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

(9) Rf-value in paper partition chromatography (by ascending method, using strips, 2.0 x 45 cm. of Toyo filter paper No. 51):

| Solvent system | Time (hours) | Rf. |
|---|---|---|
| n-Butanol saturated with water | 15 | 0.88-0.94 |
| n-BuOH·AcOH·H₂O (2:1:1) | 15 | 0.96-0.97 |
| n-BuOH·Pyridine·H₂O (1:0.6:1) | 15 | 0.92-0.97 |
| 3% NH₄Cl solution | 3 | 0.00 |
| 50% Aqueous acetone | 7 | 0.79-0.80 |
| Benzene-AcOH·H₂O (2:2:1) | 7 | 0.92-0.93 |
| Water saturated with n-BuOH | 8 | 0.13 |

(10) Antimicrobial spectrum: The antimicrobial spectrum was determined by the so-called agar dilution method as follows:

| Temperature | Medium | Test organism used |
|---|---|---|
| 37° C | Nutrient agar | Bacteria. |
| 37° C | Agar medium containing 1% of glycerol. | Mycobacteria. |
| 27° C | Agar medium containing 1% of glucose. | *Fungi. |

*Candida, Cryptococcus and Trichophyton were incubated at 37° C. though they belong to fungi.

Minimum concentrations (mcg./ml.) required for inhibition of the growth of the microorganisms are as shown in Table 4. As seen from the table, Humidin shows strong activity against yeasts such as Saccharomyces, Torula and Rhodotorula, some saprophytic fungi such as Penicillium and Rhizopus, and phytopathogenic fungi such as sclerotial fungi, anthracnose fungi and smut fungi, but it is inactive against bacteria, tubercle bacilli, pathogenic fungi, Aspergillus species, Piricularia oryzae, Fusarium species, etc. Moreover, Humidin inhibits the growth of Trichomonas vaginalis No. 1099 cultivated on F-bouillon at 37° C. for 48 hours in a dilution of 1:1,280,000 (0.76 mcg./ml.), and the growth of Tetrahymena pyriformis, Euglena gracilis and influenza virus in dilutions of 1:1,280,000, 1:320,000, and 0.05 mcg./ml., respectively.

TABLE 4

*Antibacterial Spectrum of Humidin*

| Determination period, hrs. | Minimum concentration for complete inhibition of growth, mcg./ml. | | | Remarks |
|---|---|---|---|---|
| | 24 | 48 | 120 | |
| Microorganism: | | | | |
| Bacillus subtilis | >100 | | | Bacteria. |
| Staphylococcus aureus | >100 | | | Do. |
| Escherichia coli | >100 | | | Do. |
| Proteus vulgaris | >100 | | | Do. |
| Mycobacterium IFO-3207 | >100 | | | Do. |
| Mycobacterium avium | >100 | | | Do. |
| Candida albicans | >100 | >100 | | Yeast. |
| Candida tropicalis | 100 | >100 | | Do. |
| Candida pseudotropicalis | 100 | >100 | | Do. |
| Candida krusei | 100 | >100 | | Do. |
| Candida Parakrusei | >100 | >100 | | Do. |
| Cryptococcus neoformans | 50 | 100 | | Do. |
| Trichophyton interdigitale | >100 | >100 | | Mould. |
| Trichophyton mentagrophytes | >100 | >100 | | Do. |
| Trichophyton rubrum | >100 | >100 | | Do. |
| Saccharomyces cerevisiae | 0.2 | 1 | 5 | Yeast. |
| Saccharomyces sake | 0.2 | 10 | 10 | Do. |
| Torula rubra | | 1 | 1 | Do. |
| Torula utilis | >100 | >100 | >100 | Do. |
| Hansenula anomala | >100 | >100 | >100 | Do. |
| Rhodotorula gracilis | <0.1 | 0.2 | 1 | Do. |
| Aspergillus niger | >100 | >100 | >100 | Mould. |
| Aspergillus oryzae | >100 | >100 | >100 | Do. |
| Penicillium chrysogenum | 5 | 10 | 100 | Do. |
| Mucor mucedo | >100 | >100 | >100 | Do. |
| Rhizopus nigricans | 5 | 5 | 5 | Do. |
| Phytophthora infestans | | >100 | >100 | Do. |
| Ophiobolus miyabeanus | >100 | >100 | >100 | Do. |
| Gibberella sanbinetti | | >100 | >100 | Do. |
| Gibberella fujikuroi | | >100 | >100 | Do. |
| Fusarium oxysporum f. lycoperesici. | | >100 | >100 | Do. |
| Fusarium bulbigenum | | >100 | >100 | Do. |
| Beauveria bassiana | | >100 | >100 | Do. |
| Piricularia pryzae | | >100 | >100 | Do. |
| Ustilago zeae | | 0.2 | 0.5 | Do. |
| Colletotrichum lagenarium. | | 0.5 | 0.5 | Do. |
| Gloeosporium laeticolor | | | 0.5 | Do. |
| Glomerella cingulata | | 100 | 100 | Do. |
| Sclerotinia sclerotiorum | | 0.35 | 2 | Do. |

(11) Influence of pH of the medium on the antibiotic activity: When the activity of Humidin is assayed by the agar dilution method on Saccharomyces cerevisiae cultivated on an agar medium containing 1% of glucose (pH 6, 7 and 8), it shows strong antibiotic activity at alkaline pH as shown below:

| pH of medium | 6 | 7 | 8 |
|---|---|---|---|
| U./mg | 5,000 | 15,000 | 50,000 |

(1) Influence of other factors on the antibiotic activity: Addition of dihydrostreptomycin sulfate in a dilution of 10 mcg./ml. or cystein in dilution of 1/100 mole to the medium exerted no influence on the antibiotic activity, but addition of l-ascorbic acid in a dilution of 1/100 mole decreased the activity to about 1/7.

(13) Toxicity: The toxicity of Humidin to mice weighing 14–15 g. is as follows. When injected subcutaneously with 50–100 mg./kg. of Humidin, all the animals died, but with 25 mg./kg. 50% of them survived. $LD_{50}$ was lower than 1 mg./kg. when injected intraperitoneally, and 50 mg./kg. when administered orally.

As mentioned above the properties of Humidin are quite different from those of known antibiotics so that it is a new antibiotic. Comparison of its antibacterial spectrum with those of some similar antibiotics gives the results shown in Table 5:

TABLE 5

| Microorganism | Humidin | Oligomycin[a] | Mycolutein[b] | Blasticidin A[c] |
|---|---|---|---|---|
| Aspergillus niger | >100 | 0.6, 5 | | 20 |
| Aspergillus oryjac | >100 | >80 | | >100 |
| Penicillium chrysogenum | 10 | | | 10 |
| Penicillium notatum | >100 | 5 | | >100 |
| Rhizopus nigricans | 5 | | | >100 |
| Saccharomyces cerevisiae | 1 | | | |
| Saccharomyces sake | 1 | | | |
| Hansenula anomala | >100 | >80 | | |
| Candida albicans | >100 | | 12.5 | |
| Cryptococcus neoformans | 100 | >80 | 12.5 | |
| Trycophyton ruburum | >100 | | >0.14 | |

[a] Antibiotics and Chemotherapy 4, 962 (1954).
[b] Antibiotics and Chemotherapy 5, 652 (1955).
[c] Bulletin of Agricultural Chemical Society of Japan 19, 181 (1955).
[d] Aspergillus fumigatus.
[e] Aspergillus parasiticus.

As seen in Table 5, Humidin resembles Blasticidin A in some respects, but it is widely different from the latter in the antibiotic activity against *Aspergillus niger*, and in other points. Further, while Blasticidin A is active against phytopathogenic fungi such as *Piricularia oryzae*, *Fusarium oryzae*, *Fusarium oxysporium* and *Glomerella cingulata*, Humidin is not. Humidin is also clearly different from such acid antifungal antibiotics as Antimycin-A, Virosin, Seligocidin and Antipiriculin.

The strong activity of Humidin against certain phytopathogenic fungi such as sclerotial fungi (e.g. *Sclerotinia sclerotiorum*), anthracnose fungi (e.g. *Colletotrichum glycines* and other microorganisms of the Colletotrichum species), and smut fungi (e.g. *Ustilago zeae*) renders Humidin particularly useful in the elimination of fungal plant diseases due to the said fungi, as for example sclerotinia rot of crucifers, smut disease of corn, and anthracnose of soybean and the like. Moreover, the Humidin can be employed in the crude state and even without isolation from the mycelium if desired.

The following examples set forth illustrative methods of obtaining Humidin.

EXAMPLE 1

Percent by weight

Cornsteep liquor ------------------------------ 3.0
Starch ---------------------------------------- 3.0
Peptone --------------------------------------- 0.5
Calcium phosphate ----------------------------- 0.1
Magnesium sulfate ----------------------------- 0.05
Calcium carbonate ----------------------------- 0.3

100 l. (liters) of an aqueous medium (pH 6.5–7.0) prepared with the above substances is placed in a tank and, after being sterilized by heating, inoculated with a strain (IFO–3520) of *Streptomyces humidus*. The cultivation is effected areobically at 27° C.±1° C. for 4 days with stirring. The mycelium produced is separated by filtration, washed with water and pressed as dry as possible (20 kg.). The wet mycelium is extracted with about 40 l. of acetone at 40° C. for one hour with stirring, the mycelium is filtered off, and the acetone in the extract (ca. 40 l.) is distilled at low temperatures, leaving about 7 l. of a concentrated aqueous solution. After adjusting its pH to 2.0–3.0 with hydrochloric acid, the aqueous solution is extracted twice with ¼ and ⅛ its volume of ethyl acetate. N-NaOH is added to the combined extracts until the active substance no more separates in the form of emulsion, the ethyl acetate layer is separated, and the pH of the emulsion is adjusted to 2.0–3.0 with hydrochloric acid, whereup Humidin separates out in crystalline form. The product recrystallizes from ethyl alcohol in hexagonal plates, M.P. 145–146° C. (decomp.). The yield is 9.7 g.

EXAMPLE 2

If the content of the Humidin in the broth is too low to isolate it by the method of Example 1, it is separated as follows:

500 ml. of the concentrated ethyl acetate solution (the content of Humidin is about 3 mg./ml.) obtained as in Example 1 is poured into a glass column with a diameter of 5 cm., packed with 100 g. of active carbon, and the active carbon is eluted with 1500 ml. of ethyl acetate. The resulting eluate contains practically no Humidin. The active carbon is again eluted with 2000 ml. of 95% ethanol and the eluate is concentrated in vacuo at low temperature, when Humidin separates out. From ethanol it crystallizes in plates, M.P. 145–146° C. The yield is ca. 200 mg. (40%). If the quantity of active carbon is decreased, the yield of Humidin is apt to rise.

Having thus disclosed the invention, what is claimed is:

1. A process for producing Humidin, which comprises cultivating *Streptomyces humidus* ATCC–12760 in an aqueous nutrient-containing medium under aerobic conditions until substantial antifungal activity is accumulated in the fermented broth.

2. A process for producing Humidin, which comprises cultivating *Streptomyces humidus* ATCC–12760 in an aqueous nutrient-containing medium under submerged aerobic conditions until substantial antifungal activity is accumulated in the fermented broth, and then recovering the so-produced Humidin from the mycelium.

3. A process for producing Humidin, which comprises cultivating a Humidin-producing strain selected from the group consisting of a strain of *Streptomyces humidus*, a natural mutant thereof, an induced mutant thereof and a variant thereof in an aqueous nutrient-containing medium under submerged aerobic conditions at about 23 to 30° C. over about 2 to 8 days, and then recovering the so-produced Humidin from the mycelium.

4. Humidin, a substance which, in the pure state, (a) crystallizes as colorless hexagonal plates melting at 145–146° C. with decomposition, (b) contains the elements carbon, hydrogen and oxygen including about 63.03–63.51% C. and about 8.31–8.66% H, (c) has an optical rotation:

$[\alpha]_D^{34} = -6°$ (c.=1, ethanol)
$[\alpha]_D^{25} = -10°$ (c.=1, acetone)
$[\alpha]_D^{25} = -8°$ (c.=1, dioxane)

(d) has an IR-spectrum as shown on the accompanying drawing, (e) has a UV spectrum with absorption maxima in the vicinities of 245 m$\mu$ and 285 m$\mu$, and (f) has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

5. A process for producing the substance defined in claim 4, which comprises cultivating a Humidin-producing strain of *Streptomyces humidus* in an aqueous nutrient medium until substantial antifungal activity is imparted to the resultant mycelium.

6. A process as claimed in claim 5, and recovering the substance defined in claim 4 from the said mycelium.

7. A process according to claim 6, wherein the mycelium is first isolated and is then subjected to solvent extraction, and the said substance recovered from the so-obtained extract.

References Cited in the file of this patent

Waksman: Bacteriological Reviews, 21:1, March 1957, pages 4–5, 167–65 AB-Taxa.

Sneath: J. Gen. Microbiol, 17, pages 184–200, August 1957, 167–56 AB-Taxa.

Proc. Japan Acad. Sci., 36; 648 et seq. 1956 through Applied Microbiology 6:1, page 77 January 1958.